2 Sheets--Sheet 1.
J. GILLOTT & P. COPLEY.
Machines for Cutting Coal.
No. 144,529.
Patented Nov. 11, 1873.
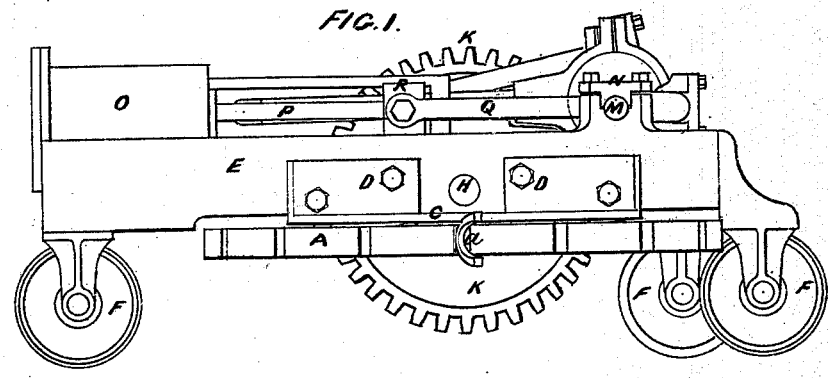
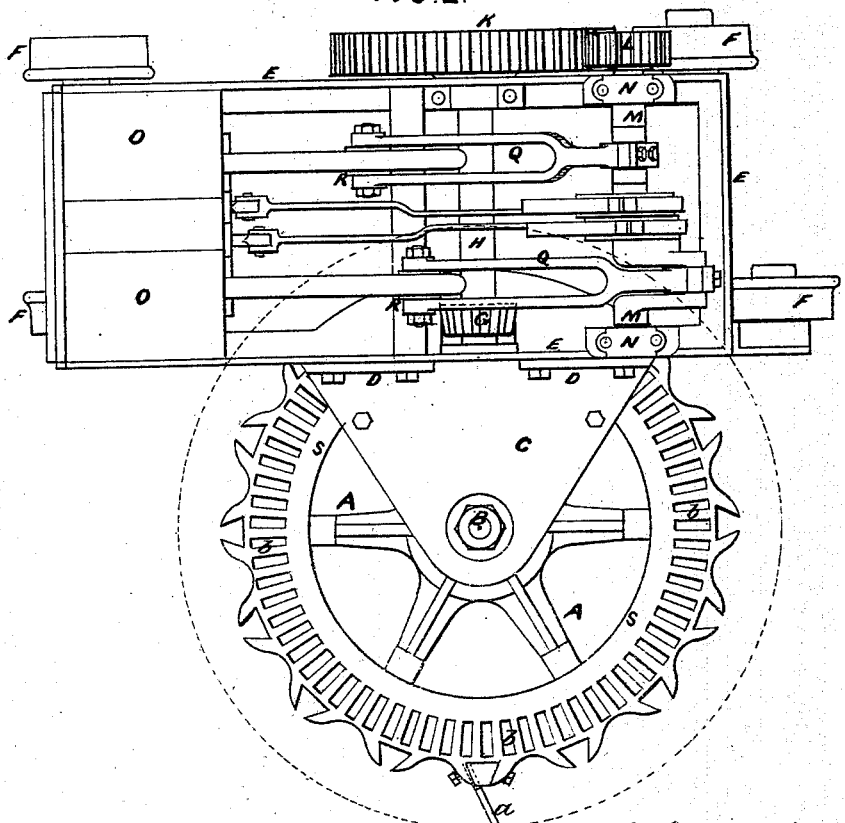
Witnesses, Harry Smith,
Thomas McSwain
J. Gillott
P. Copley
By their attys
Howson & Son J. GILLOTT & P. COPLEY.
Machines for Cutting Coal.
No. 144,529. Patented Nov. 11, 1873.

UNITED STATES PATENT OFFICE.

JOHN GILLOTT AND PETER COPLEY, OF BARNSLEY, ENGLAND.

IMPROVEMENT IN MACHINES FOR CUTTING COAL.

Specification forming part of Letters Patent No. 144,529, dated November 11, 1873; application filed September 15, 1873.

*To all whom it may concern:*

Be it known that we, JOHN GILLOTT and PETER COPLEY, both of Barnsley, in the county of York and Kingdom of England, engineers, have invented Improvements in Machinery or Apparatus for Cutting or Getting Coal, Stone, and other Minerals, of which the following is a specification:

This invention relates to a peculiar construction, arrangement, and combination of apparatus to be worked by any suitable prime-mover for the purpose of cutting or getting coal, stone, and other minerals.

Figure 3:
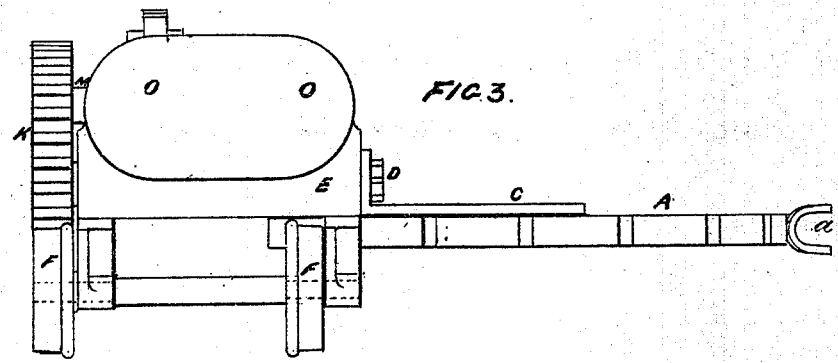
Figure 4:
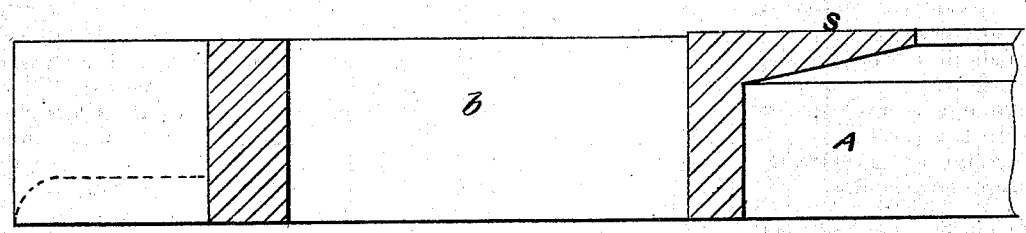
Figure 5:
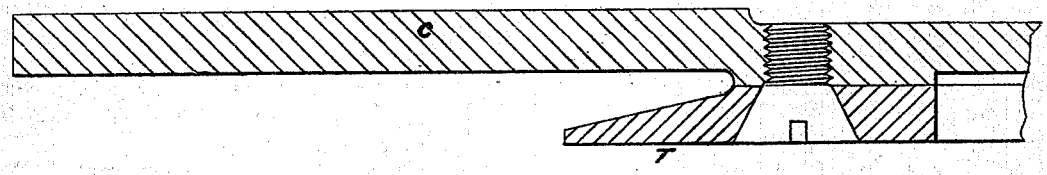

Figure 1 of the drawings is a side elevation the carriage or main framing and engine of our improved machine for cutting or getting coal, stone, and other minerals. Fig. 2 is a corresponding plan. Fig. 3 is an end elevation thereof. Figs. 4 and 5 are enlarged details of a portion of the cutter-wheel and carrying-bracket.

A is the horizontal cutting wheel or disk, of cast-iron or other suitable metal, in the periphery of which are mounted, in suitable sockets, a number of cutters, a a, of any well known or suitable form. One of these cutters only is shown in our drawing. This disk revolves round a stationary center, B, fitted in the bracket or covering-plate C, which plate is bolted to the main framing at D, the cutter projecting above the surface of the wheel, and above the horizontal portion of the bracket, so as to produce a cut of such a width that the wheel and bracket beyond the hub may pass into said cut, thereby enabling a deeper cut to be made with a given size of cutter-wheel. The main framing E of the engine is mounted on traveling wheels F F. The cutter-wheel A has cog-teeth b made on its surface. In these teeth gears a bevel-pinion, G, fast on one end of a spindle or shaft, H, working in suitable bearings in the carriage. On the opposite end of the shaft H there is keyed a toothed wheel, K, into which gears a corresponding wheel, L, fast on the driving or crank shaft M of the engine. This shaft works in suitable bearings N N.

The crank-shaft may be driven by any convenient prime mover; but we prefer to employ a compressed-air engine, of which O O represent the two cylinders; P P, the piston-rods; Q Q, the connecting-rods; R R, the slide-blocks.

It will thus be seen that, on starting the engine, a slow but powerful rotatory motion will be imparted to the cutter wheel or disk A, the cutters a cutting or scooping out the coal, stone, or other mineral from the bottom of the groove toward the face or front of the working.

S is the bevel-flange, Fig. 4, projecting inward on the upper side of the cutter-wheel A, and T the corresponding retaining strip or clip, secured to the under side of the overhanging carrying-bracket C, Fig. 5, the said internal bevel-flange S on the cutter-wheel revolving in the space between the said strip T and the bracket C.

During the action of the cutters the entire machine is caused to travel slowly along in any well-known manner in order to keep the cutters well up to their work.

We claim—

The cutter-wheel A and its flange S, in combination with the bracket C and its flange T, for the purpose specified.

In witness whereof we have signed our names to this specification in the presence of two subscribing witnesses.

JOHN GILLOTT.
PETER COPLEY.

Witnesses:
C. W. WHITMAN,
   *U. S. Consulate, Huddersfield.*
F. F. HIBBERT.
   *U. S. Consulate, Sheffield.*